July 24, 1956   P. P. SUNDBACK   2,755,689
METHOD OF HOBBING STEELS
Filed July 19, 1951
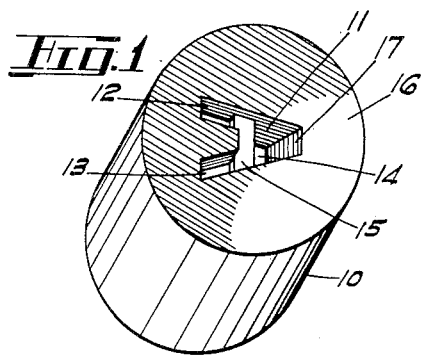
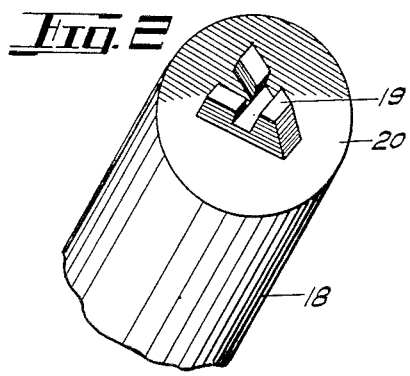
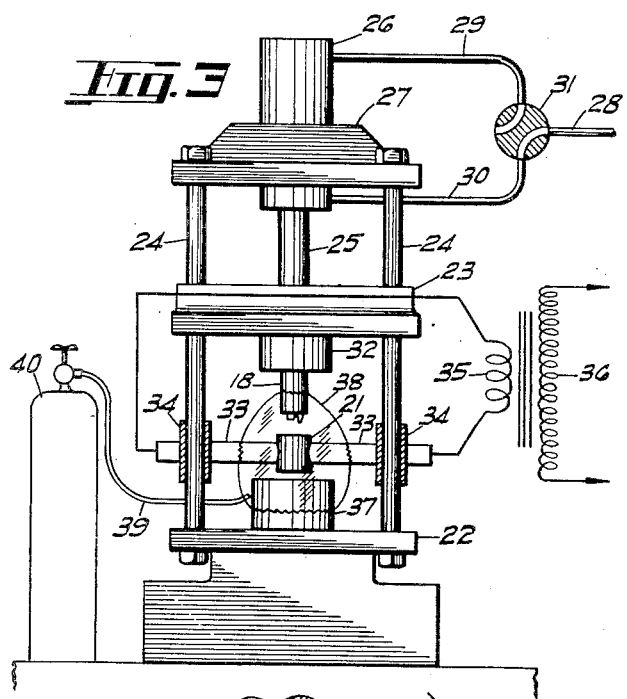
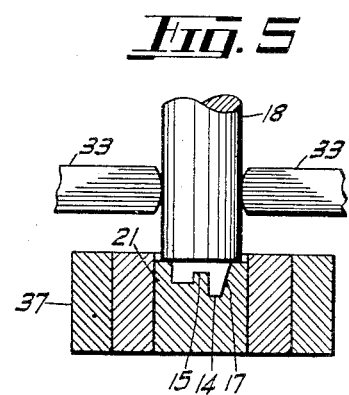
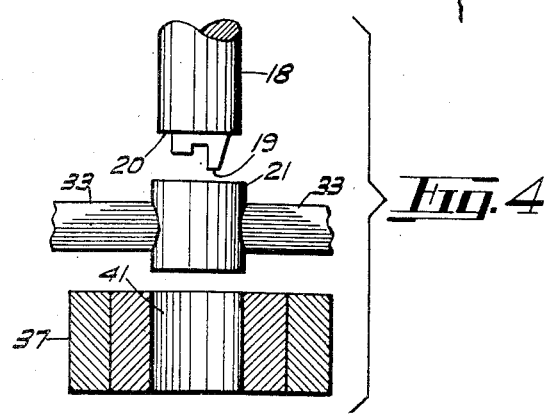
INVENTOR
PAUL P. SUNDBACK
BY
ATTORNEY United States Patent Office 2,755,689
Patented July 24, 1956

2,755,689

METHOD OF HOBBING STEELS

Paul P. Sundback, Meadville, Pa.

Application July 19, 1951, Serial No. 237,512

1 Claim. (Cl. 76—107)

My invention relates to improvements in methods of hobbing steels, and is applicable to the well-known metal working technique, commonly called hobbing, which consists of forming a positive replica in a metal blank of a negative form, machined or otherwise shaped on a hob, by forcing the hob into the blank. Such technique is commonly used for making die cavities for the multiple production of parts by die-casting of metal, injection moulding of plastics, or the like, a number of cavities being hobbed in a single die, or a number of cavity inserts being hobbed, from a single hob and the multiple cavity die being used to cast or mould simultaneously a number of replicas of the hob.

An object of the invention is to provide a method of hobbing whereby tool steel may be hobbed, which heretofore has been impossible of attainment, because the softest condition obtainable for such a steel is still too hard to permit the sinking of a hob therein without using hobbing pressures which are difficult or impossible to attain under ordinary production conditions, or because, even if such pressures are obtainable, such hardness would result in distortion or fracture of the hob before completion of the replica, or which would result in a replica which was only a very rough approximation of the shape of the hob.

Another object of my invention is to devise a method of hobbing which will permit the transfer of an exact positive replica of the negative hob which may be of much more complicated geometry than has been permissible by prior methods, and which eliminates the necessity for providing a tapered hob, which, obviously, limited prior hobbing to reproduction of articles in which such a taper in the finished article could be tolerated.

An additional object is to devise a method of hobbing in which a substantially limitless number of positive replicas may be made from a single hob, since the stresses in the hob during the hobbing operation, according to my method, are substantially negligible as compared with the stresses developed in a hob under conventional hobbing conditions.

A still further object is to produce such improvements in hobbing methods that the pressures required to sink the hob in the blank being worked is substantially less than is required by conventional methods, whereby hobbing presses of considerably smaller size, and hence less cost, may be used, and, as a result of the press being smaller and lighter, much faster and more economical hobbing may be done.

Yet another object is to devise a means of so rapidly heating a metal blank for hobbing, and effecting the hobbing of the heated blank so rapidly, preferably in the presence of an inert or reducing atmosphere, that substantially no impairment of the surface of the hobbed blank takes place by scaling or oxidation of the metal of the blank, so that cavities of much more delicate detail may be hobbed than by conventional methods.

With the above and other objects, which will hereinafter appear as the specification proceeds, in view, my invention consists of the method of hobbing all as particularly described and illustrated with reference to the accompanying drawing, in which:

Fig. 1 is a perspective view of a single cavity insert for a multiple-cavity die-casting die in which a cavity has been hobbed according to my invention;

Fig. 2 is an inverted perspective view of a hob embodying part of my invention, by means of which a cavity such as is shown in Fig. 1, may be hobbed;

Fig. 3 is a front elevational view of a hobbing press illustrating my method of hobbing, with some accessories shown schematically;

Fig. 4 is a fragmentary elevational view, with some of the parts shown in section, of a metal blank, a hobbing ring and a hob constructed according to my invention, positioned ready for sinking the hob in the blank; and Fig. 5 is a view similar to Fig. 4 showing the relative position of the parts of Fig. 4 at the instant of completion of the hobbed cavity.

Like characters of reference designate corresponding parts in the different views.

In order to describe my invention, I have illustrated in Fig. 1 a cylindrical cavity insert, designated generally as 10, and provided with a cavity 11. A number of such inserts 10 could be let into cylindrical recesses in the face of a die plate (not shown), the whole assembly forming one half of a multiple cavity die for die-casting or injection moulding of parts having the shape of the cavity 11.

The geometry of the cavity 11, as I have illustrated it, is of no commercial significance, but has been chosen to illustrate some respects wherein my invention distinguishes over previously known methods, and for this purpose it should be noted that the cavity 11 is of substantial A shape, having legs designated by numerals 12 and 13, and a head portion 14 which is considerably deeper in the insert than the legs 12 and 13: that the insert has a plateau 15 which is considerably shallower in the insert than either the head 14 or the legs 12 and 13 and most particularly, that the whole cavity is formed of plane surfaces intersecting at right angles, both each other and the surface 16 of the insert, except for one surface 17 which extends at an angle of substantially less than 90° from the surface 16.

In Fig. 2 I have illustrated a hob from which the cavity 11 of Fig. 1 may be formed. Such a hob consists of a conventional shaft 18, provided with the hob proper, designated generally by the reference character 19, projecting from one end of the shaft. It should be noted, however, that the hob proper, 19, consists of all the metal of the shaft 18 projecting above a shoulder 20 (Fig. 2), and that the shoulder 20 is a plane surface extending uniformly for a substantial distance from the hob outline, and at right angles to the main axis of the hob.

As illustrated in Figs. 3, 4 and 5, the hob 19 may be forced into a tool steel blank 21, of substantially the same overall dimensions before hobbing as the insert 10, in a conventional hobbing press. Such a press may consist of a base or lower platen 22, and an upper platen or ram 23, movable in a vertical path on tie-rods 24 by means of a fluid operated piston 25, working in a hydraulic cylinder 26, supported in a yoke 27 connected by the tie-rods 24 with the base. It should be noted that the piston 25 is double acting, i. e., it may be moved downwardly or upwardly to move the upper platen 23 downwardly or upwardly by admitting fluid pressure from a supply line 28, alternatively to the upper end of the cylinder 26 through a pipe 29, or to the lower end of the cylinder 26 through a pipe 30, by suitable actuation of a four-way valve 31. The shank 18 of the hob 19 may be secured to the upper platen 23 of the press by means of a conventional holder 32.

At the hobbing press I provide means for heating the blank 21, such as a pair of combined electrodes and clamps 33, 33, each slidably mounted in an insulating support 34 secured to a pair of tie-rods 24 of the press, and each connected to the secondary winding 35 of an electric transformer, such secondary having high current capacity at low voltage, and the transformer having a high voltage primary winding 36, connected to a conventional electrical supply source, of relatively high voltage and low current capacity. Other means, such as, for example, creating a high frequency alternating electrical field in the blank (commonly referred to as induction heating) could be used for heating the blank. The requirement important to my invention is that the blank be heated very rapidly, and in such manner that it may be hobbed substantially at the instant it reaches my preferred hobbing temperature.

I may also use a conventional hobbing ring 37, resting on the lower platen 22 of the press, and may maintain the blank 21 in a non-scaling, inert or reducing atmosphere, during the hobbing operation, by means such as an envelope 38 enclosing the blank when the blank is positioned between the electrodes 33, provided with ports to accommodate the electrodes 33, the hob shank 18, the hobbing ring 36, and a tube 39 for supplying a gas, such as nitrogen or hydrogen, from any convenient source such as a commercial cylinder 40. In practice the envelope 38 may consist of a transparent plastic bag with cut-out sections to accommodate the mechanical parts listed, and the cut-out sections need fit the mechanical parts only moderately well in order to maintain an inert atmosphere within the envelope, as long as a slight flow of gas from the cylinder 40 is maintained at all times during which the atmosphere is required.

To perform a hobbing operation according to my improved method, the blank 21 in which a cavity 11 is to be hobbed is clamped between the electrode holders 33, 33, in the path of the hob 19 and immediately over the bore 41 of the hobbing ring 37, as best illustrated in Fig. 4. The envelope 38 is arranged in place as shown in Fig. 3, a flow of gas is initiated from the cylinder 40 to displace air from the vicinity of the blank 21 and is maintained at such a rate as to exclude the air therefrom. Under these conditions the primary 36 of the transformer is energized to send the current from the secondary 35 through the electrodes 33 and the blank 21, whereupon the electrical resistance of the blank 21 to the current causes the blank to heat very quickly. At the instant that the blank reaches the desired temperature, to be referred to later herein, the valve 31 is actuated to cause the piston 25 to drive the platen 23 of the press, carrying the hob 19, rapidly downward which causes the hob 19 to contact the hob blank 21 and carry it down from between the electrodes 33 and into the bore 41 of the hobbing ring 36, and, as the stroke of the press ram continues, to force the hob 19 below the surface of the blank 21, as shown clearly in Fig. 5. It may be noted that the diameter of the shank 18 of the hob is sufficiently less than the diameter of the blank 21 that it passes between the electrodes 33 when it has pushed the blank 21 free thereof, so that the electrical circuit through the electrodes 33, 33 is broken at the instant that the blank 21 loses contact with them. At the instant that the hob 19 reaches the bottom of its travel, as dictated by the depth to which it is desired to sink the hob in the blank 21, the valve 31 is actuated to retract the platen 23 of the press and to withdraw the attached hob from the cavity in the blank 21. As soon as this cycle of the press has been completed the hobbed insert 10, which was originally the blank 21, may be removed from the hobbing ring 37 by any conventional means, whereafter it appears as shown in Fig. 1.

In a typical hobbing operation, according to my invention, a tool-steel blank would be heated to a temperature of 2000° F. in a period of approximately seven seconds by electric current supplied at two volts, and as soon as this temperature is reached a hardened high-speed steel hob would be sunk by the press at a ram travel rate of 500 inches per minute, and the hob would be withdrawn from the blank at the instant that the required depth of hobbing was reached, which would involve a dwell of the hob in the blank of approximately one-twentieth of a second.

A hobbed blank or cavity insert obtained from such an operation will be clean, scale- and oxide-free, and the cavity will be an exact positive replica of the negative form of the hob, because by heating the blank rapidly by the electric current, and particularly by heating it while it is in position in the hobbing press, for immediate sinking of the hob as soon as it has reached the required temperature, it will be at elevated temperature such a short time that substantially no scaling or oxidation can take place, and any impairment which might otherwise occur is eliminated by the inert or reducing gas from the supply 40 confined around the blank by the envelope 38. Additionally, since the heated blank is carried into the cold hobbing ring by the motion of sinking the hob, the blank is hot enough, and, therefore, soft enough, to be hobbed with a minimum of pressure and a minimum of stress on the hob at the instant that the hob sinks, but cooling of the blank starts substantially as soon as the press stroke starts and progresses very rapidly as soon as it comes into contact with the cold hobbing ring. By withdrawing the hob at substantially the instant it reaches the desired depth, it is in contact with the heated blank for such a short time that it is not damaged, and in fact is not even annealed.

By providing the shoulder 20 on the hob, the metal of the blank which is displaced by the hob, and which, in conventional hobbing methods, rises above the surface of the blank and has to be machined off, is held beneath the surface of the blank. In addition the shoulder prevents the "falling away," as it is called, of the hobbed metal from the margins of the surface of the blank through which the hob enters, presumably by developing hydrostatic pressure in the softened blank metal which causes it to flow into the reentrant spaces of the hob. In conventional hobbing operations a hob has to be sunk to a much greater depth than is required for the depth of cavity desired and the surface of the hobbed blank then has to be machined off to a depth at which the hobbed cavity outline is the same as the outline of the hob.

By heating the steel for hobbing, the pressure required to sink the hob into the blank is much less than would be required otherwise, and in fact it is only by heating the blank that tool steels and other refractory alloys may be hobbed at all. In previous attempts at hobbing tool steels or other refractory alloys it may have been possible to obtain an impression in one blank, or, at most, a few blanks, from a single hob, but the life of the hob was so short as to make the process economically impractical. It should be noted that the shape of the hobbed cavity illustrated would be quite impossible to achieve by conventional methods, in that there is no taper on its sides and all but one end. By conventional methods such a cavity, if achieved at all, would have walls which sloped from the surface of the insert to the base of the cavity, even if the longitudinal hob surfaces were parallel with the hob axis. The cavity illustrated could not be hobbed, or, at best, could not be reproduced many times from a single hob, because the metal of the blank between the legs 12 and 13 which, as shown, diverge from the head portion 14, would not flow from between the corresponding legs on the hob and would exert tremendous outward stresses on the legs of the hob which would cause them to either spread or fracture: it would also be impossible to force the metal of the blank to flow closely around the form of the plateau 15 of the cavity. This plateau, which, by the use of my method, comes up flat and with sharp corners, would only rise to an approximation of its required height and would have rounded margins. Furthermore, in attempting to hob the cavity shown, by conventional methods, the surface of the hob which corresponds to the surface 17 of the cavity would be subjected to so much pressure, due to the fact that the surface is oblique to the sinking path of the hob, that the portion of the hob corresponding to the head 14 of the cavity would either deform or break during hobbing.

When I refer to my hobbed cavity as being an "exact replica" of the hob, I mean that the cavity has the exact form, in all details, of the hob, even though, obviously, some or all of the dimensions of the cavity may be very slightly different from corresponding dimensions of the hob, due to the fact that the blank is hot, or at least of a higher temperature than the hob, at the instant that the cavity form is completed and the hob is withdrawn, and subsequent cooling of the blank may change its dimensions slightly. Even so, since my heating of the blank is effected by means which permits very close control of the blank temperature at the instant of hobbing, any small difference in dimension between the hob and the cavity may be predetermined and, if desirable, compensated for in dimensioning the hob.

While my improved hobbing method is particularly desirable for hobbing tool steels, it is also of value in hobbing other metals, especially those which are normally considered difficult to hob. In such cases, of course, the temperature to which the blank is heated may be either lower or higher than the 2000° F. mentioned in the example herein. For hobbing intricate shapes, the method may be advantageously used even with so-called hobbing iron, in which case the temperature to which the blank is heated might be as low as 800° F.; on the other hand, for some very refractory alloys the temperature may be as high as 2300° F. The process is applicable to all tool steels, and by tool steels I mean any or all of the steels listed in the text "Tool Steels" by Gill, Roberts et al., published in 1946 by the American Society of Metals, although I do not limit the use of the invention to those steels. For tool steels I have found that the preferred range of temperatures to which the various steels should be heated for hobbing is between 1800° F. and 2300° F.

It should be noted that the upper limit, 2300° F., of my preferred range of temperatures is higher than that normally used even for forging of steels, and such a temperature is permissible, at least in part, by my use of the shoulder 20 on my hob, a reducing atmosphere in the envelope 38, and a high press ram speed. Under these conditions, the cracks or surface checks which would appear in a hobbed or forged blank produced by orthodox methods at this high temperature are prevented, or eliminated if they do develop, as the hob enters the blank, by the shoulder on the hob developing pressure in the blank metal which prevents their formation or closes them up, the reducing atmosphere meanwhile preventing scaling in the cracks which would otherwise prevent them from "healing."

It will, therefore, be evident that my method of hobbing may be used for making dies which may in turn be used for forging numbers of duplicate parts. Such dies have to be made of a highly refractory metal in order to withstand protracted exposure to the hot metal being forged, and my method is the first, to my knowledge, by which forging dies may be hobbed.

While I have described and illustrated certain details of carrying out my improved process and certain ranges of variables, such disclosure is for purposes of illustration only, and is intended to impose no limitation on the scope of the invention beyond those set forth in the appended claim.

What I claim as my invention is:

The method of hobbing a substantially exact negative replica of a hob in a tool steel blank having end faces and a periphery which comprises: surrounding the blank in a non-scaling inert atmosphere; heating the blank to a softening and normally scale-producing temperature in said atmosphere; closely confining the periphery of the heated blank in a hobbing ring while maintaining said inert atmosphere about said blank and ring; ramming a relatively cool hob smaller in lateral extent than one of said faces against said one face while maintaining said hob, blank and ring in said inert atmosphere; compressing the confined blank, in the ramming direction, over substantially the entire surface of that portion of the rammed blank face, as the hob reaches full depth, until the softened blank metal flows under hydrostatic pressure against substantially all surfaces of the hob and then withdrawing said hob from the blank before the hob attains softening temperature while maintaining said atmosphere about said blank, ring and hob; and maintaining the hobbed blank in said inert atmosphere until said blank cools below scaling temperature.

References Cited in the file of this patent

UNITED STATES PATENTS

| 448,904 | Yorke | Mar. 24, 1891 |
|---|---|---|
| 499,820 | Champney | June 20, 1893 |
| 524,092 | Mercader | Aug. 7, 1894 |
| 628,687 | Bradley | July 11, 1899 |
| 1,542,047 | Ferrari | June 16, 1925 |
| 1,543,683 | Simons | June 30, 1925 |
| 1,904,698 | Simons | Apr. 18, 1933 |
| 1,932,426 | Stevens | Oct. 31, 1933 |
| 1,952,388 | Simons | Mar. 27, 1934 |
| 2,014,698 | Reilly | Sept. 17, 1935 |
| 2,066,372 | Tomalis | Jan. 5, 1937 |
| 2,089,030 | Kratky | Aug. 3, 1937 |
| 2,325,989 | Tryon | Aug. 3, 1943 |
| 2,374,942 | Kurtz | May 1, 1945 |
| 2,422,612 | Borne | June 17, 1947 |
| 2,513,710 | Brauchler | July 4, 1950 |

FOREIGN PATENTS

| 187,953 | Great Britain | May 31, 1923 |
|---|---|---|
| 398,133 | Germany | July 24, 1924 |
| 555,025 | Great Britain | July 29, 1943 |

OTHER REFERENCES

The Hobbing Process for Mould Production from Machinery, April 17, 1947.